(No Model.)
M. P. COLVIN.
CLOTHES POUNDER.
No. 248,712.  Patented Oct. 25, 1881.
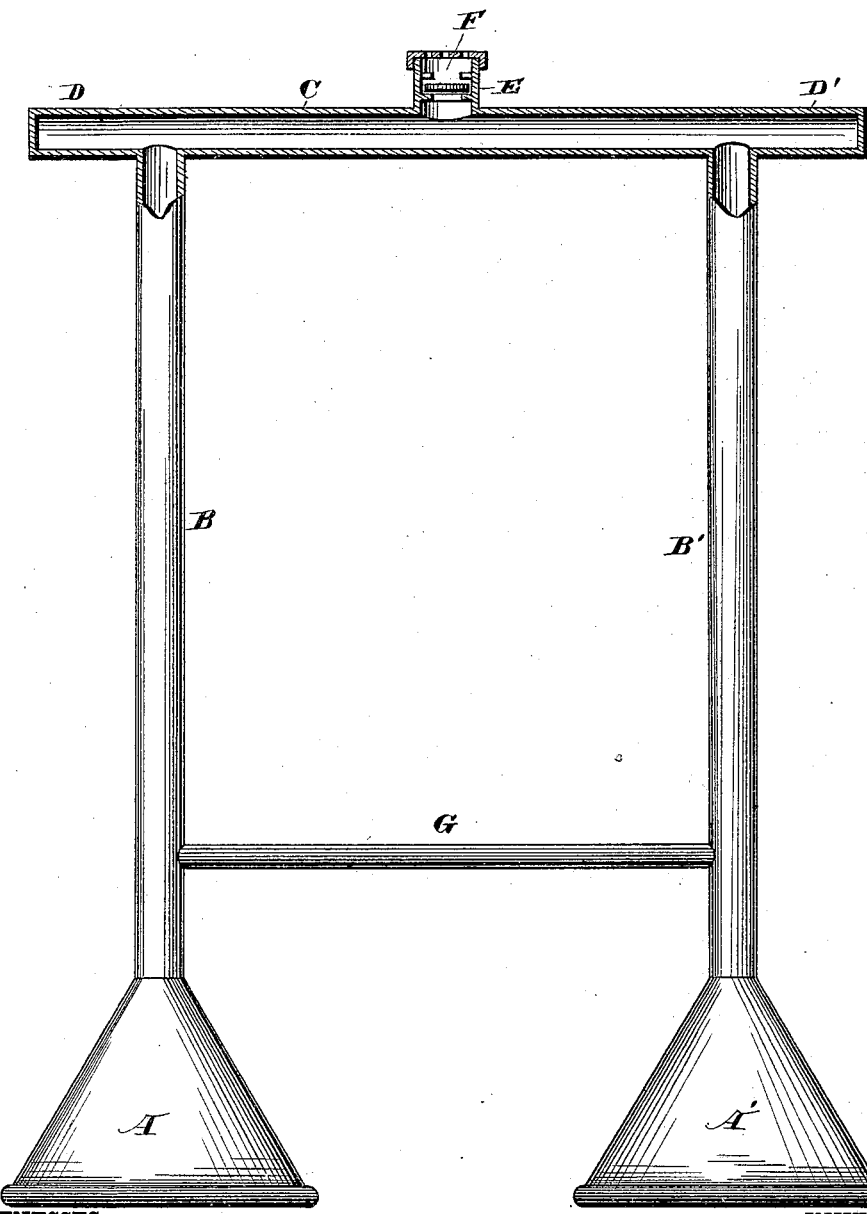
WITNESSES  
E. I. Nottingham  
Herman Moran
INVENTOR  
M. P. Colvin  
By H. A. Seymour  
ATTORNEY

UNITED STATES PATENT OFFICE.

MARGARET P. COLVIN, OF BATTLE CREEK, MICHIGAN.

CLOTHES-POUNDER.

SPECIFICATION forming part of Letters Patent No. 248,712, dated October 25, 1881.

Application filed May 10, 1881. (No model.)

*To all whom it may concern:*

Be it known that I, MARGARET P. COLVIN, of Battle Creek, in the county of Calhoun and State of Michigan, have invented certain new and useful Improvements in Clothes-Pounders; and I do hereby declare the following to be a full, clear, and exact description of the invention, such as will enable others skilled in the art to which it pertains to make and use it, reference being had to the accompanying drawings, which form part of this specification.

My invention relates to an improvement in pounder washing-machines, the object being to provide a pounder-washer which shall be cheap and durable in its construction and effective in use.

With these ends in view my invention consists in certain features of construction and combination of parts, as will hereinafter be explained and pointed out in the claims.

The accompanying drawing represents a view, part in section and part in side elevation, of my improvement.

A A' are the conical clothes-pounders, which may be of any desired construction and furnished with any desired arrangement of deflectors or braces.

To the conical pounders A A' are secured the hollow standards B B', the upper ends of which are firmly secured to a hollow cross-bar, C, the latter projecting at its opposite ends beyond the standards B B', thereby forming handles D D'. A small tube, E, is attached to the transverse bar or tube C, and has secured therein a downward-closing flap-valve, F; or, instead of a flap-valve, a downward-closing ball-valve may be employed. The outer ends of the hollow bar C are closed. G is a brace located near the lower ends of the hollow standards and firmly secured to the same.

The improved pounder is operated by hand and the conical pounders moved around and operated upon the clothes to any part of the tub. As the conical pounders descend and their lower edges are immersed in the water air is driven therefrom upwardly through the hollow standards, from thence through the hollow cross-bar C into the valve-casing and out past the valve F. As the pounders are raised the partial vacuum formed in both the conical washers serves to effectually close the valve F by the excess of atmospheric pressure on its upper surface and prevent the ingress of air, whereby the conical pounders are enabled to raise the clothes and subject them to a thorough rinsing action of the water, which is drawn through the fabric at every upward stroke of the pounders.

The efficiency of my improved machine is much enhanced by the employment of a single valve in connection with two pounders, because the air is quite thoroughly exhausted from the pounders and the single valve is held snugly against its seat while the pounders are being raised, thus preventing the ingress of air to the hollow standards and conical pounders. Again, in my improvement but little outlay is met with in its construction, as the conical pounders, standards, connecting-tube, and valve-casing may all be constructed of sheet-tin, and a single valve will suffice for both conical pounders.

I am aware that a valve has been connected with the hollow upright standard of a single pounder, and hence I make no broad claim to the combination of a valve with the handle or standard of a clothes-pounder, but restrict the claim to my particular improvement, whereby a single valve operates to govern the supply of air to both pounders.

Having fully described my invention, what I claim as new, and desire to secure by Letters Patent, is—

The combination, with the conical pounders A A', hollow standards B B', and hollow connecting-tube C, of the single downward-closing valve F, located in the tube or valve casing E, attached to the tube C, substantially as set forth.

In testimony that I claim the foregoing I have hereunto set my hand this 3d day of May, 1881.

MARGARET PLUNKET COLVIN.

Witnesses:
CHARLES L. PALMER,
OLIVER W. PEARSON.